INVENTORS
G.L. ALLERTON
H.D. MARSHALL
R.L. SIEGEL III

BY

ATTORNEY

# United States Patent Office 3,539,459
Patented Nov. 10, 1970

3,539,459
METHODS AND APPARATUS FOR ANODIZING SERIAL RESISTANCES, IN PARTICULAR, A RESISTANCE PAD ATTENUATOR
George L. Allerton, Orefield, Howard D. Marshall, Stroudsburg, and Robert L. Siegel III, Easton, Pa., assignors to Western Electric Company, Incorporated, New York, N.Y., a corporation of New York
Filed Dec. 6, 1968, Ser. No. 781,816
Int. Cl. C23b 5/48; B01k 3/00
U.S. Cl. 204—15
12 Claims

ABSTRACT OF THE DISCLOSURE

Nonlinear anodization of a resistive workpiece, such as a distributed thin film T-pad attenuator, is provided by establishing an independent voltage gradient along the workpiece during the anodization thereof. A thin film T-pad attenuator can be anodized to substantially equal input and output impedances by providing a direct current through the serial portion of the attenuator in such a direction so that, upon anodization thereof, the input and output impedances tend toward equalization.

---

The present invention relates generally to methods of and apparatus for anodizing a pair of serially connected thin film resistors so that the resistors are trimmed to substantially equal values, and more particularly, to the anodization of a distributed thin film T-pad attenuator to a percision T-pad having equal input and output impedances with a fixed attenuation loss. Accordingly, the general objects of the invention are to provide new and improved methods and apparatus of such nature.

BACKGROUND OF THE INVENTION

Attenuator pads are used in telephony equipment to reduce transmitted signal levels in a carrier system to the same magnitude without introducing distrotion. By equalizing signal levels, interference of one signal with another is minimized or eliminated. Attenuator pads, which are resistive devices, are characterized by their insertion loss, and input and output impedances. They are artificial lines whose series and shunt elements are pure resistances. The amount of loss caused by insertion of a pad in a circuit can be accurately computed. The loss is independent of frequency when the terminating impedances are resistances.

Either π or T structures can be used as pads, as is well known in the art. Both are electrically equivalent.

In present day technology, with a view toward microminiaturization and mass production, it is desirable to produce a T-pad attenuator constructed simply of a distributed thin film on a substrate. Heretofore, a T-pad attenuator required three discrete resistors connected together to form a T. Typically, attenuators having discrete resistors were commonly used in transmission line applications. One disadvantage of such a pad arrangement is that such attenuators provide only one loss value. Thus, to meet normal operating demands, large stocks were required. To offset such requirements, increments in loss value were commercially limited to 0.25 db steps, a degree of precision not consistent with modern trunk-loss tolerance requirements, particularly for data transmission. Finally, the physical package of the prior art attenuators was not compatible with modern, modular equipment designs.

To overcome these limitations, adjustable thin film step attenuators were developed on two ceramic substrates, as will be described in greater detail hereinafter.

In producing a precision, distributed thin film T-pad attenuator, initially the surface resistance through the attenuator is provided lower than nominal value so that it is necessary to anodize the attenuator to the precise desired value. The distributed thin film T-pad is not composed of three separate resistors, but rather is comprised of two distinct portions, namely, a series portion and a shunt portion. When the two halves of the series portion of the T are not initially equal, due to some minor imperfections in its mask or otherwise, normal anodization of the series portion of the T-pad attenuator magnifies the resistive unbalance between the input impedance and the output impedance.

Thus, it becomes an object of this invention to provide novel methods and apparatus for anodizing thin film T-pad attenuators so that the input and output impedances are substantially equal. It is a further object of this invention to provide novel methods and apparatus for anodizing T-pad attenuators so that upon anodization thereof, the input and output impedances are not further unbalanced.

SUMMARY OF THE INVENTION

In accordance with one embodiment of this invention, an electrically T-shaped metallic film resistive device is trimmed to a T-pad, having the series portion of the T-pad connected between a pair of terminals A and B and having the shunt portion of the T-pad connected between a terminal C and a point on the series portion substantially midway between the terminals A and B. The pad is trimmed to values having a fixed serial resistance and equal input and output impedances so that the resistance across the terminals A and C and the resistance across the terminals B and C are each substantially equal to a predetermined resistance value and to a value having a predetermined attenuation loss. The device is trimmed by placing an anodizing electrolyte along the series portion of the resistive device. The serial resistance between the terminals A and B is measured. Then, a determination is made whether the resistance between the terminals A and C is greater than or less than the resistance between terminals B and C. A direct current is then applied through the serial portion of the device, between the terminals A and B, in a direction from the lower value resistance to the greater value resistance, thereby establishing a voltage gradient along the serial portion of the device. A pulse of anodizing voltage is applied across the serial portion of the device and a cathode in contact with the electrolyte. When the measured serial resistance is less than the fixed value, the resistance between terminals A and C and between terminals B and C is recompared, the direct current through the serial portion is reapplied, the anodizing voltage is reapplied, and the serial resistance is remeasured. Subsequently, an of anodizing electrolyte is placed along the shunt portion of the device; alternately, the shunt portion is anodized and the attenuation loss of the device is measured, until the attenuation loss becomes equal to a predetermined value.

BRIEF DESCRIPTION OF THE DRAWING

Other objects, advantages and features of the invention will be apparent from the following detailed description of specific embodiments thereof, when taken in conjunction with the appended drawings, in which.

GENERAL DESCRIPTION

Figure 1:
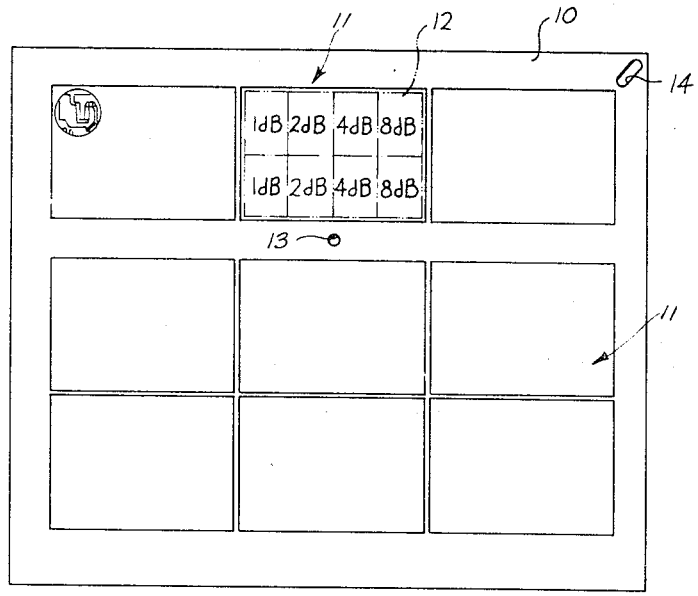
FIG. 1 is a plan view of a substrate having a plurality of thin film circuits thereon, each circuit including a plurality of thin film T-pad attenuators.

Referring to FIG. 1, there is shown a substrate 10 (of glass, ceramic, or other suitable material) having nine identical substrate circuits 11—11 therein. Each substrate circuit 11 contains eight T-pads 12—12 which can be used in pairs for balanced attenuation. With one set of circuits providing loss values of 1, 2, 4, and 8 db and another set providing loss values of 0.1, 0.2, 0.4, and 0.8 db, by means of sliding switches, the two sets of circuits, wired in series, can provide 0 to 16.5 db loss in 0.1 db steps.

One of the dominating requirements for the pad is the manufacture of low-value, tight-tolerance resistors, for example, 3.450±0.1725 ohms. The resistance tolerance becomes necessary to meet a design attenuation tolerance of ±0.01 db and an impedance tolerance $$+3\% \\ -2\%$$

Figure 2A:
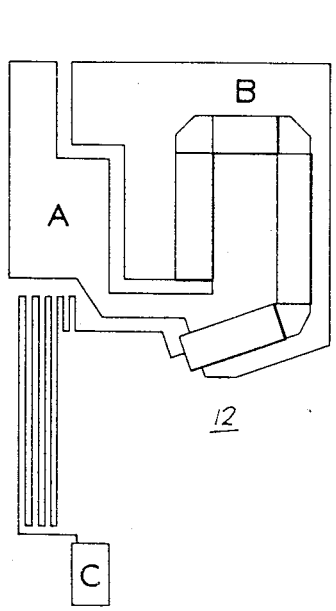
FIG. 2A is a plan view of a low value T-pad attenuator in an enlarged scale magnified from the portion encircled in FIG. 1.

To keep the series resistor area small, while maximizing the width of the series resistor area, a segmented design shown in FIG. 2A was developed. The resistance of the series portion of the T-pad is from contact points A to B.

To achieve the required circuit impedance, it is desirable that the resistance from A to C equal that from B to C. Normally, a T-pad would have three separate resistors allowing each to be anodized to the specific design value independently. To conserve space, the series resistors are formed by a single area of a film-forming, resistive material, such as tantalum nitride.

Figure 3:
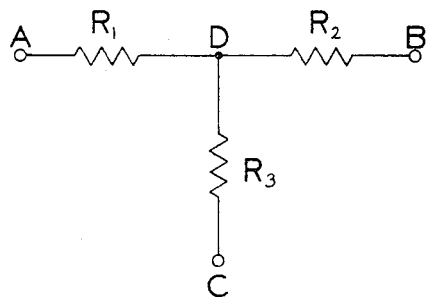
FIG. 3 is an electric schematic equivalent for the circuits of FIGS. 2A and 2B.

Referring to the equivalent circuit shown in FIG. 3, the T-pad is anodized to value such that $$R_1 + R_3 = R_2 + R_3$$

and accordingly $R_1 = R_2$, where: $R_1$ is the resistance between point A and an imaginary point D, midway between points A and B; $R_2$ is the resistance between point B and point D; and $R_3$ is the shunt resistance between point C and point D.

Referring back to FIG. 1, the substrate 10 includes a hole 13 located somewhat centrally therein and a slot 14 located near its corner. The purpose of the hole 13 and the slot 14 is to simplify the orientation of the substrate 10 with the various masks for depositing electrolyte, for example.

Figure 2B:
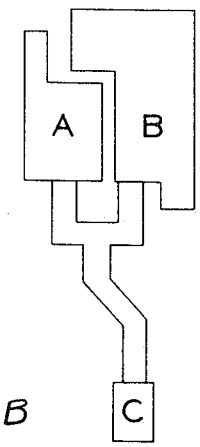
FIG. 2B is a plan view of a distributed thin film T-pad attenuator having a higher insertion loss than the attenuator shown in FIG. 2A.

The distributed thin film circuit shown in FIG. 2A, in general, is equivalent to that shown in FIG. 2B. Moreover, for purposes of this invention, the pads of FIGS. 2A and 2B are electrically equivalent to the T-pad of FIG. 3.

Figure 4:
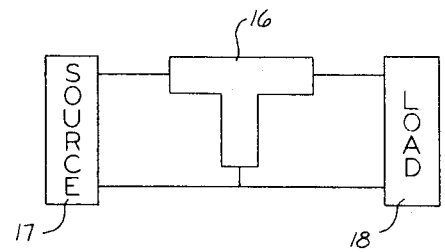
FIG. 4 illustrates the use of a T-pad attenuator in an electric circuit.

FIG. 4 illustrates a T-pad 16 in an electrical circuit. The T-pad 16 is inserted between a source 17 and a load resistance 18 to provide a predetermined attenuation loss.

TABLE I

| Insertion loss, db | 1 | 2 | 4 | 8 |
|---|---|---|---|---|
| $R_{AB}$ (ohms) | 34.501 | 68.772 | 135.76 | 258.31 |
| $R_{AC} = R_{BC}$ (ohms) | 2,617.7 | 1,325.8 | 696.76 | 413.00 |
| Input/output impedance (ohms) | 300 | 300 | 300 | 300 |

Table I illustrates some constants for T-pads having predetermined attenuation losses and having equal input and output impedances. For example, as shown in Table I, a T-pad attenuator having a loss of 1 db with an input and output impedance of 300 ohms has a serial resistance $R_{AB}$ equal to 34.501 ohms and has a resistance measured from the shunt terminal C to either one of the serial terminals A and B of 2617.7 ohms. Similarly, values for the insertion loss or attenuation loss for 2, 4, and 8 db are given in Table I. Other values of resistances for different attenuation losses, now shown, can be calculated.

Figure 5:
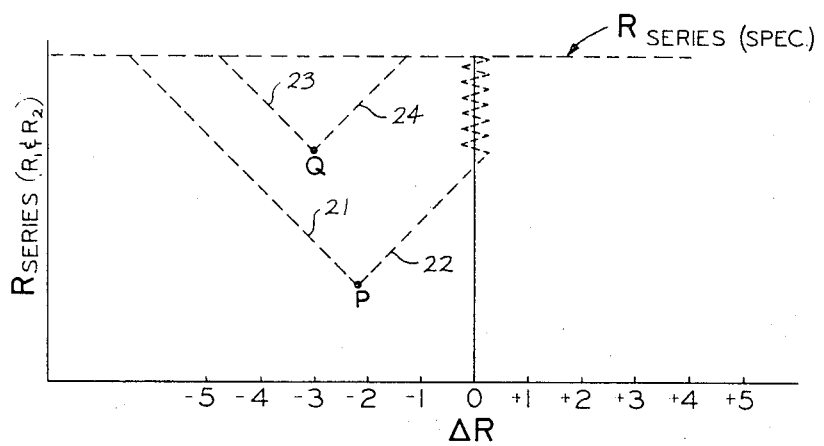
FIG. 5 is a chart which illustrates the comparison of anodizing and balancing a series resistance to a predetermined value, in accordance with this invention, with anodization as performed by prior art techniques.

Referring to FIG. 5, there is shown a diagram which sets forth a comparison of different samples showing the relationships of linear anodization in accordance with prior art techniques, and nonlinear anodization in accordance with certain features of this invention.

Initially, the serial resistor of a thin film T-pad attenuator is produced having a serial resistance somewhat less than a desired resistance, R series (spec.). Ideally, both serial portions $R_1$ and $R_2$ should be exactly equal to each other so that the input and output impedances of the attenuator are equal. As a practical matter, due to mask imperfections, due to deposition imperfections, and the like, small differences, $\Delta R$, between the two serial portions are usually present prior to anodization thereof.

Sample P, shown in FIG. 5, has an initial serial resistance with unequal serial components, $R_1$, $R_2$ (see FIG. 3). As shown, the point P lies to the left of the 0 balance line, indicating a value of $\Delta R$ unbalance. The value $\Delta R$ is the difference in value between $R_1$ and $R_2$. With linear anodization, in accordance with prior art techniques, the entire serial resistance (both portions $R_1$, $R_2$) is anodized until the serial resistance equals R series (spec.) in a direction 21 away from balance. Hence, the sample P becomes trimmed to a value which, although having an absolute value of R series (spec.), has unequal components. Specifically, the resistors $R_1$ and $R_2$ are unequal.

In accordance with the apparatus and methods hereinafter described, the sample P can be nonlinearly anodized so as to anodize the lowered valued resistance portion at a faster rate than the higher valued resistance portion. As shown in FIG. 5, the locus showing the path of anodization of the sample P is shown by path 22, wherein the locus traverses a path, substantially rapidly, toward balance wherein the resistance of both the serial portions are equal to each other. Anodization takes place substantially about the balance line until the overall serial resistance is equal to R series (spec.). Hence, the sample P can be anodized from a value wherein the components are unequal to the value wherein the components are equal.

In another example, a sample Q has an initial value as indicated, wherein linear anodization, of the prior art, would tend to cause the sample Q to be anodized along a line 23 to R series (spec.) which, as shown in FIG. 5, is substantially unbalanced from the desideratum where $R_1 = R_2$. When, however, the sample Q is anodized, in accordance with the principles of this invention, namely, nonlinearly andoized so as to cause the lower valued resistance to anodize at a faster rate than the higher valued one, the sample Q tends to be anodized toward the zero unbalance line along the path 24. Anodization ceases when the serial resistance equals R series (spec.), however, since the sample Q is so far displaced from the balance line optimum anodization does not occur. Although optimum anodization does not occur, the amount of percent unbalance between the two serial portions of resistors is less than the percent unbalance existing prior to anodization, and is less than the percent unbalance existing with a sample which is linearly anodized.

DESCRIPTION OF SERIAL ANODIZATION CIRCUIT

Figure 6:
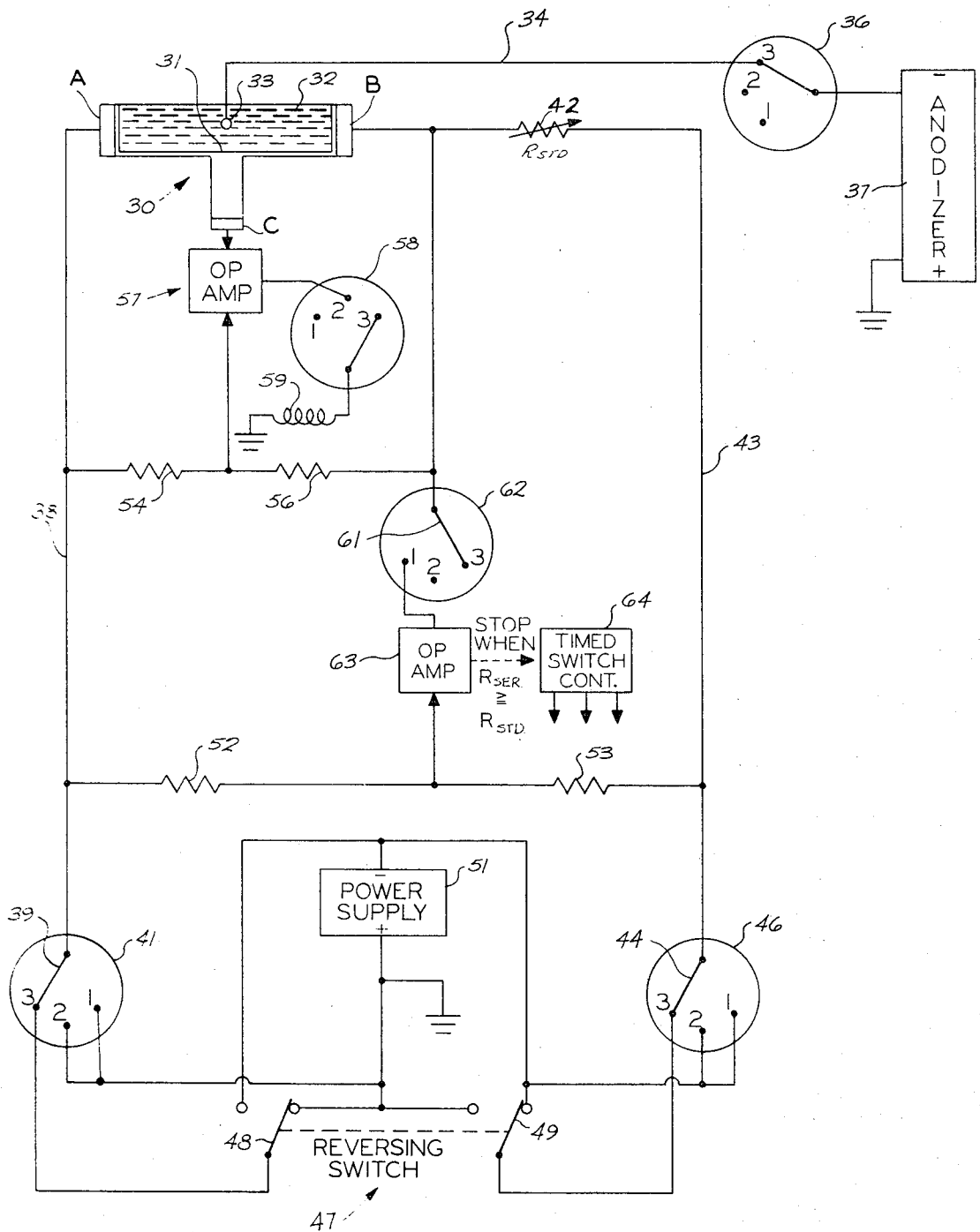
FIG. 6 is an electrical schematic of apparatus for anodizing the series portion of a thin film T-pad attenuator, in accordance with one embodiment of this invention.

Referring to FIG. 6, there is shown an electrical block diagram of apparatus for anodizing the serial portion of a distributed thin film resistive device 30 for ultimate use as a T-pad attenuator. The T-pad attenuator has serial terminals A and B, and a shunt terminal C, with distributed thin film resistance, of suitable material such as tantalum nitride, joining the three terminals A, B, and C. For purpose of discussion it is presumed that an imaginary terminal D exists at the junction of the serial portion with the shunt portion of the device. The resistive portion of the T-pad attenuator is shown, generally, by the reference numeral 31.

An anodizing electrolyte, which may be mildly acidic, is placed onto the serial portion of the resistive film 31. The anodizing electrolyte 32 may include a paste of sodium carboxymethyl cellulose with 0.01% citric acid. The electrolyte can be contained within dam walls of asphalt, or other insulating material, to prevent shorting to the contacts, such as described by Basseches et al., U.S. Pat No. 3,148,129.

A cathode 33 is placed into contact with the anodizing solution 32 without directly contacting the resistive film 31.

The cathode 33 is coupled via a line 34 to a contact No. 3 of a three position switch 36, having its arm coupled to the negative side of an anodizer 37. The positive side of the anodizer is coupled to a point of reference potential, such as ground.

The terminal A of the T-pad device 30 is coupled via a line 38 to an arm 39 of a three position switch 41.

The B terminal of the device 30 is coupled through a variable resistance 42 and a line 43 to an arm 44 of a three position switch 46.

A double-pole, double-throw reversing switch 47 has a first arm 48 which is coupled to contact point No. 3 of the switch 41. A second arm 49 of the reversing switch 47 is coupled to the contact point No. 3 of the switch 46. With the reversing switch 47 in one position, as shown in the drawing, the arms 48, 49 engage the positive and negative sides, respectively, of the power supply 51, the positive side thereof being coupled to a point of reference potential, such as ground. With the reversing switch 47 thrown in the opposite direction, the arms 48 and 49 engage the negative and positive sides, respectively.

The Nos. 1 and 2 contacts of the switch 41 are coupled to the positive side of the power supply 51. The Nos. 1 and 2 contacts of the switch 46 are coupled to the negative side of the power supply 51.

Equal bridge resisances 52 and 53, of high value, for example. 50 kilohms each, serially join the arms 39 and 44 of the switches 41 and 46. High valued equal bridge resistances 54 and 56, which may be 5 megohms each, serially are connected between the line 38 and the B terminal.

The C terminal of the device 30 is coupled to one input of an operational amplifier 57, the junctions of the two bridge resistors 54 and 56 being coupled to a second input of the operational amplifier 57. The output of the operational amplifier 57 is coupled to contact No. 2 of a three position switch 58. The arm of the three position switch 58 is coupled through a reversing switch relay 59 to a point of reference potential, such as ground.

With the arm of the switch 58 contacting the No. 2 contact, the operational amplifier 57 and the reversing switch relay 59 operate such that, when the voltage at the terminal C is positive with respect to the voltage at the junction of the two resistors 54–56, the relay 59 causes the reversing switch 47 to assume one of its two positions, namely, the position illustrated in FIG. 6. When the voltage at the terminal C is negative with respect to that at the junction, the relay 59 causes the reversing switch 47 to be thrown to the other of its two positions, namely, the opposite position of that depicted in FIG. 6.

By design of an external high impedance detector circuit, including the operational amplifier 59 and the resistors 54, 56, the resistance $R_3$ appears as a short circuit, thereby allowing access to the otherwise nonaccessible point D (FIG. 3), between $R_1$ and $R_2$.

The terminal B is coupled to the arm 61 of a three position switch 62 having its No. 1 contact coupled to one input of an operational amplifier 63. A second input of the amplifier 63 is coupled to the common junction of the serial bridge resistors 52–53. The operational amplifier 63, hence, compares the voltage between the terminal B and the junction of the resistors 52–53, and is designed to provide a control signal when the voltage across the terminal B and the resistors 52–53 junction point changes polarity. This control signal is coupled to halt the operation of a timed switch control 64.

The timed switch control 64 controls the three-position switches 36, 41, 46, 58, and 62. switching them in sequence, respectively, from their respective contacts Nos. 1 to Nos. 2 to Nos. 3, and back to Nos. 1 in an iterative procedure. The repetitive switching continues under the control of the timed switch control 64 until the operational amplifier 63 instructs the control 64 to stop the switching.

Description of shunt anodization circuit

Figure 7:
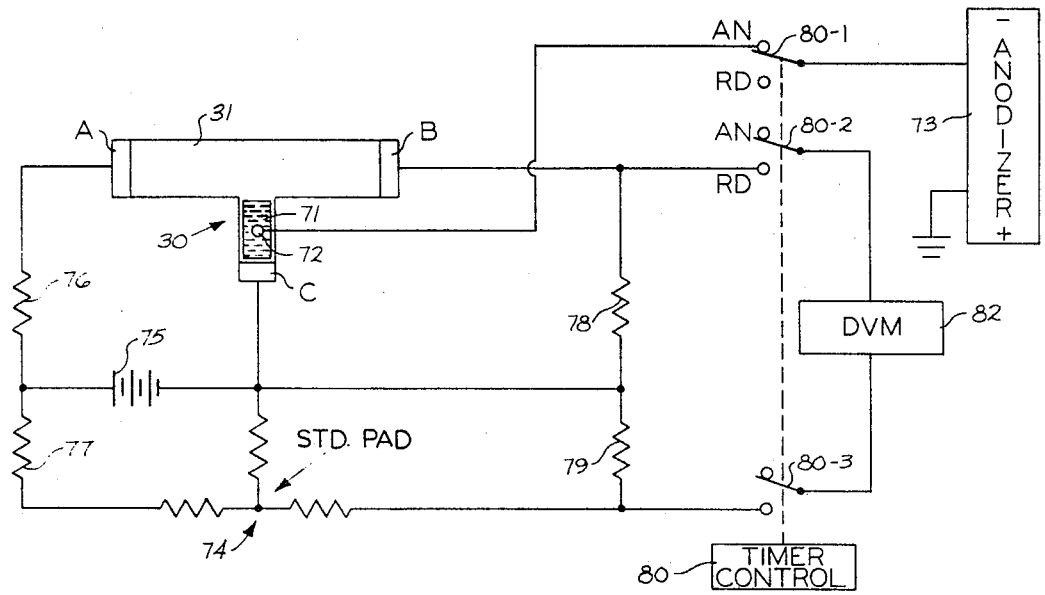
FIG. 7 is an electrical schematic of apparatus for anodizing the shunt portion of a thin film T-pad attenuator, for anodizing the shunt portion of a thin film T-pad tor, in accordance with certain features of the invention.

Referring to FIG. 7, the thin film resistive device 30 is shown placed in a circuit for anodizing the shunt portion of the T-pad until a predetermined attenuation loss is reached.

The shunt portion of the T-pad 30 is covered with an electrolyte 71. The electrolyte is contained within isolating dam walls, not shown, preventing undesired interaction. A cathode 72 is immersed into the electrolyte 71 in a noncontacting relation to the resistive surface 31 of the T-pad 30, the cathode 72 being coupled to the negative terminal of an anodizer 73. The positive terminal of the anodizer 73 is coupled to a point of reference potential, such as ground.

The circuit includes a standard, reference T-pad 74 having a known attenuation loss. The shunt resistances of the T-pads 30 and 74 are coupled together to a point of reference potential, such as ground. The terminal A of the T-pad 30 is coupled through a first standard resistor 76 to one side of a battery 75, the other side of the battery being coupled to ground. Similarly, one serial terminal of the standard T-pad 74 is coupled through a like standard resistor 77 to the battery 75. Identical standard resistors 78 and 79 serially connect the B terminal of the T-pad 30 to the other serial terminal of the standard T-pad 74, the common junction of the standard resistors 78, 79 being coupled to ground.

Ganged switches 80–1, 80–2, and 80–3 are alternately switched between "anodize" and "read" positions under the direction of a timer control 80.

During an anodizer operation, the cathode 72 is coupled to the anodizer 73 by way of the switch 80–1.

During a reading operation, a high impedance voltmeter, such as a digital voltmeter 82, is coupled to the terminal B of the thin film resistive T-pad 30, and to the corresponding terminal of the standard T-pad 74 by way of switches 80–2 and 80–3, respectively.

Description of the operation of the series and shunt anodization

Figure 8:
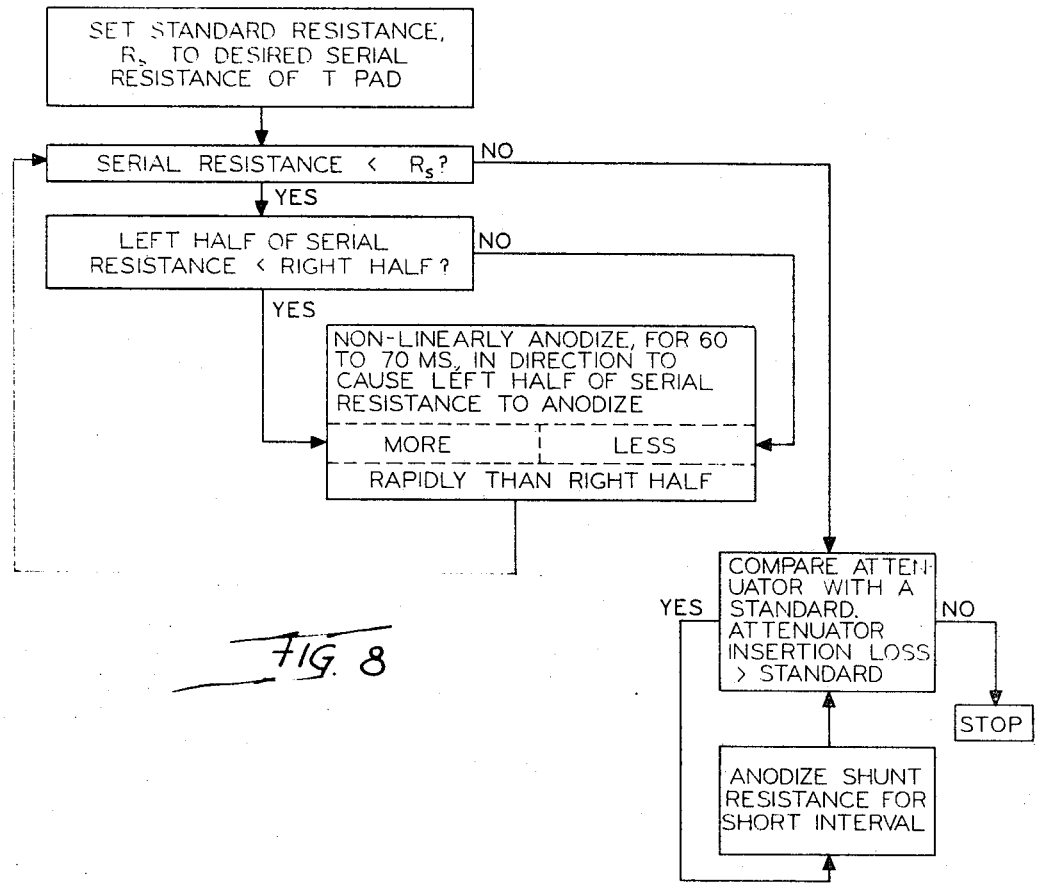
FIG. 8 is a flow chart which illustrates a method of practicing one embodiment of this invention.

Referring to FIG. 8, there is shown a block logic diagram which illustrates a method of practicing this invention, setting forth the various steps to be followed. The method can be practiced manually, it can be practiced automatically (as by the apparatus illustrated in FIGS. 6 and 7), and it can be practiced by combinations thereof.

Set standard resistance to desired serial resistance of T-pad

Referring now to FIGS. 6 and 8, the standard resistance 42 is set to the desired serial resistance of the T-pad.

Is serial resistance less than standard resistance?

The serial resistance of the T-pad 30, between the contacts A and B, is measured to determine whether the serial resistance is greater than or less than the set standard resistance 42. This can be achieved under the control of the timed switch control 64 which actuates the five switches 36, 41, 46, 58, 62 so that their respective arms initially contact their respective No. 1 contact positions.

During this measuring operation, the common point of the terminal A of the T-pad 30 and the bridge resistor 52 is coupled to ground, via the arm 39 of the switch 41. The negative side of the power supply 51 is coupled through the arm 44 of the switch 46 to the common connection of the standard resistor 42 and the bridge resistor 53. The voltage at the common junction of the standard resistor 42 and the terminal B of the T-pad 30 is sensed by the operational amplifier 63 via the arm 61 of the switch 62 and is compared to the voltage at the common junction of the bridge resistors 52 and 53. The operational amplifier 63 provides a signal when the junction of the standard resistor 42 and the terminal B of the T-pad 30 becomes equal to or becomes negative with respect to the voltage at the common junction of the bridge resistors 52, 53 and instructs the timed switch control 64 to halt the switching sequencing when the serial resistance of the T-pad is equal to or greater than the standard resistance 42. When the serial resistance is equal to or greater than that of the standard resistance 42, the operation continues by comparing the attenuator versus a standard, and anodizing the shunt resistance, if necessary.

Is the left half of the serial resistance less than right half?

If the serial resistance is less than that of the standard resistance 42, the left half of the serial resistance of the T-pad 30 is compared to the right half under control of the timed switch control 64 which actuates the five switches 36, 41, 46, 58, 62 so that their respective arms engage the No. 2 contact positions.

As shown in FIG. 6, negative potential is applied by the power supply 51, through the arm 44 of the switch 46, the line 43, through the standard resistor 42 to the common junction of the terminal B with the bridge resistance 56. The positive side of the power supply 51 is coupled through the arm 39 of the switch 41 and line 38, to the common junction of the terminal A of the T-pad 30 with the bridge resistor 54. The "center tap," i.e., terminal C, of the T-pad 30 and the common junction of the bridge resistors 54 and 56 are each coupled to the operational amplifier 57 so as to compare the balancing of the resistance $R_1$ with the resistance $R_2$, wherein $R_1$ is the resistance between the terminal A and the imaginary terminal D, and $R_2$ is the serial resistance between the imaginary terminal D and the terminal B (FIG. 3). The output of the operational amplifier 57 is coupled to the reversing switch relay 59, through the switch 58. The characteristics of the operational amplifier 57 and the reversing switch relay 59 are such that when the resistance $R_2$ is greater than the resistance $R_1$, the reversing switch 47 is in the position as shown. When the resistance $R_1$ is greater than the resistance $R_2$, the reversing switch 47 is switched to the opposite position. After the comparison of $R_1$ and $R_2$, the timed switch control causes the switches 36, 41, 46, 58, and 62 to assume their No. 3 contact positions.

With the arms of the switches contacting their No. 3 contacts, and with the switch 47 in the position as shown (assuming $R_1 < R_2$), the terminal A is coupled to ground by way of the line 38, the arm 39 of the switch 41, and through the arm 48 of the reversing switch 47. Also, the positive side of the power supply 51 is coupled to ground. The negative side of the power supply 51 is coupled via the arm 49 of the reversing switch 47, through the arm 44 of the switch 46, along the line 43, and through the standard resistance 42, to the terminal B, thereby placing a negative potential at the terminal B. The negative terminal of the anodizer 37 is connected via the switch 36 and the line 34 to the cathode 33, thereby applying anodizing current between the cathode and the serial resistance portion of the pad 30.

During anodization, since the terminal A is at ground and the terminal B is at a negative potential, a relatively high voltage drop exists between the resistive material 31, near the terminal A, and the cathode 33, while a relatively low voltage drop is present between the cathode 33 and the material, near the terminal B of the T-pad 30. Hence, nonlinear anodization takes place in a direction to cause the left half (as viewed in FIG. 6) of the serial resistance to anodize more rapidly than the right half.

When, following a comparison step, $R_1$ is found to be greater than $R_2$, the switch 47 will be placed in a position opposite to that depicted in FIG. 6. Then, the terminal A is coupled to the negative side of the power supply 51 by way of the line 38, the arm 39 of the switch 41, and the arm 48 of the reversing switch. The terminal B is coupled to ground via the standard resistance 42, the line 43, the arm 44 of the switch 46, and the arm 49 of the reversing switch 47.

During anodization, with the terminal A maintained at a negative potential and the terminal B at ground, a relatively low voltage drop is present between the cathode 33 and the resistance material 31, near the terminal A of the T-pad 30, while a relatively high voltage drop exists between the material near the terminal B and the cathode 33. Hence, nonlinear anodization takes place in a direction to cause the left half (as viewed in FIG. 6) of the serial resistance to anodize less rapidly than the right half.

This nonuniform anodization takes place for a fixed period of time, as desired. In accordance with a specific embodiment, a period of 60 to 70 milliseconds, under automatic control, was found to be suitable.

Nonlinear anodization may be explained as follows: the rate of anodization, (i.e., the rate of anodicoxide growth) is directly proportional to the anodization current density, $j$, which is related to the anodizing voltage by the expression $$j = \alpha e^{BE}$$

where $\alpha$ and $B$ are constants and $E$ is the electric field strength.

As should be apparent, with no bias or direct current passing through the resistive film, whereby the entire film is maintained at a constant potential, a uniform current density is provided to the entire film upon application of the anodizing voltage. However, with a direct current passing through the film, a voltage gradient is produced along the film, and with the application of the anodizing voltage, a nonuniform current density will be generated along the film, causing nonuniform anodization with the points of higher potential anodizing faster than the lower points.

The measuring, balancing, and anodizing operations continue, iteratively, with respect to the serial resistance until the serial resistance has achieved the value of the desired standard resistance 42. Upon completion of the serial anodization, the operation then continues with the anodization of the shunt resistance.

Is the attenuator insertion loss greater than a standard?

Referring to FIGS. 7 and 8, the thin film T-pad 30 is compared against the standard T-pad 74 to determine whether or not the attenuator insertion loss has reached a standard value. If so, the operation is halted.

Anodize shunt resistance for short interval

If the attenuator insertion loss has not reached the standardized value, the shunt resistance is anodized for a short interval under the control of the timer control 80 and the associated switches 80–1, 80–2, 80–3. The timer control continues switching the switches 80–1, 80–2, 80–3 between the "read" and "anodize" positions until the attenuator insertion loss has reached the standardized value, at which time the operation is halted.

Automatic, large scale anodization of T-pads to value

Figure 9:
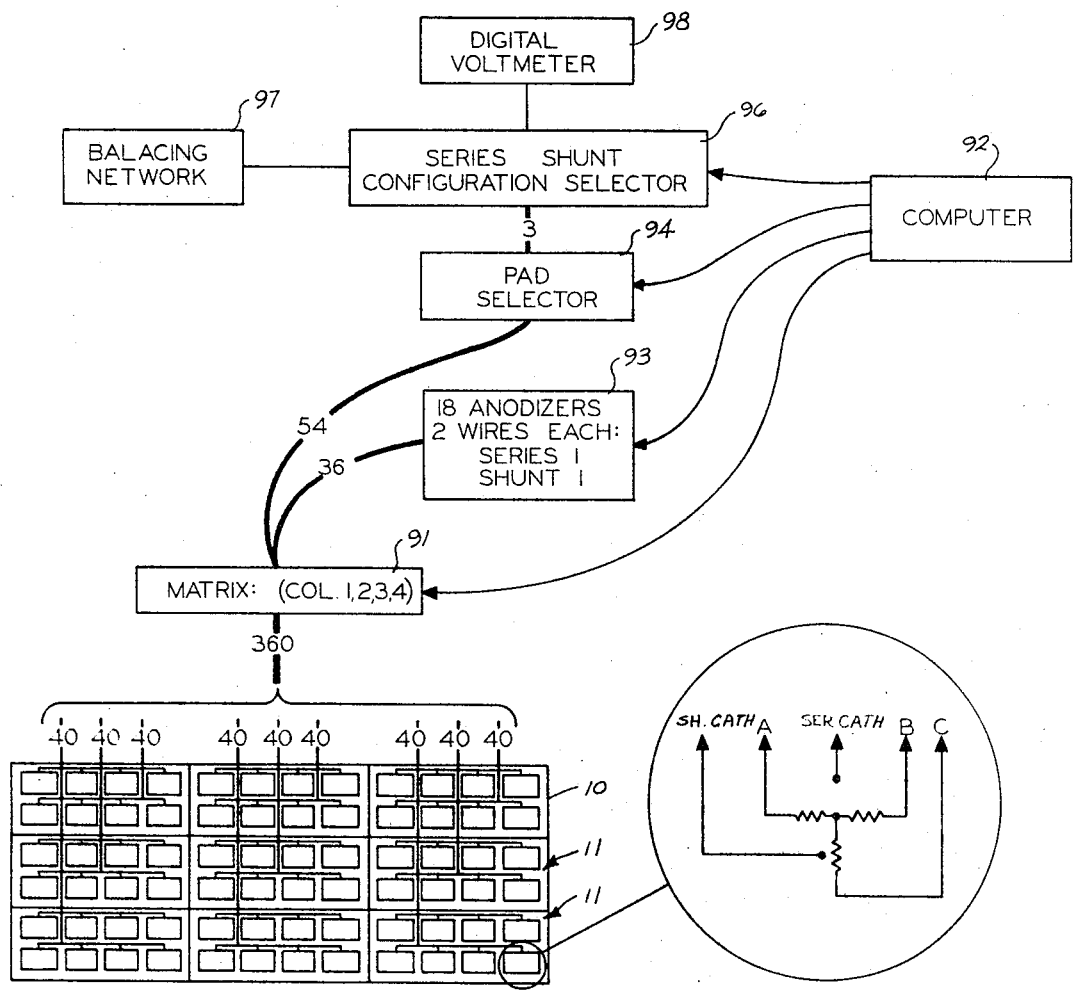
FIG. 9 is a block diagram of apparatus for trimming all the T-pad attenuators on one substrate on a mass production basis, in accordance with other features of this invention.

Referring to FIG. 9, there is shown, in block diagram, a system for the automatic anodization of a large number of T-pads to a desired value, all under the automatic control of a computer. This can be achieved with a single ceramic substrate 10, having the nine identical substrate circuits 11—11, each of which contains eight T-pads 12—12. Hence, one substrate 10 contains 72 T-pads. The 72 T-pads can be anodized to a desired value with eighteen anodizers having two wires each, one for series and one for shunt anodization. As seen schematically in the magnified portion of FIG. 9, each T-pad 12 requires five wires for controlling its anodization: one wire for each of the three terminals of the T-pad, one wire for the serial cathode, and one wire for the shunt cathode. Hence, there are forty wires per substrate circuit 11, or a total of 360 wires for the entire substrate 10. These 360 wires are fed into a matrix 91. Under control of a computer 92, one of four different sets of the wires is selected by the matrix 91, corresponding to the pad columns 1, 2, 3, or 4 of each circuit 11—11. Of these 90 wires, 36 wires are coupled to the eighteen anodizers 93. Each of the anodizers have two wires coupled thereto, one for series, one for shunt anodization. The remaining 54 wires are coupled to a pad selector 94; the computer 92 being coupled to the pad selector 94 so that only three of the 54 wires are gated therethrough. The signals on the three wires carry data corresponding to a specific selected pad. These three wires are coupled to a series/shunt configuration 96, a balancing network 97, and a digital voltmeter 98. The series/shunt configuration 96 can be controlled by a computer 92. Hence, in actual operation, one substrate containing nine circuits with a total of 72 T-pads, requiring 144 sets of anodizations, has its various T-pads automatically properly anodized by means of the apparatus set forth in FIG. 9.

Figure 10:
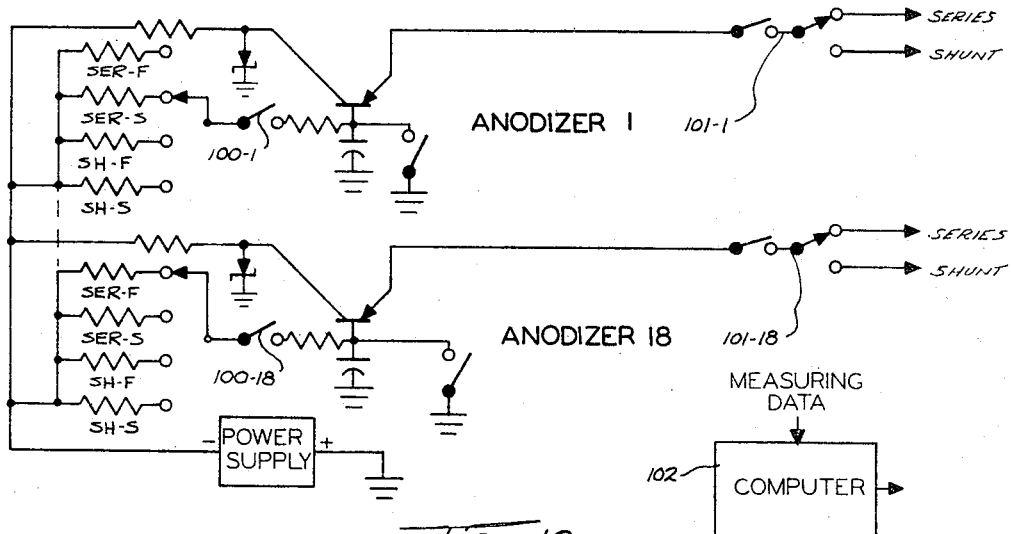
FIG. 10 is an electrical diagram illustrating the automatic control for various voltage pulses for the various anodizers for practicing this invention.

FIG. 10 is a block diagram of circuitry for anodizing the serial and shunt resistors in an expeditious manner. Namely, the anodizers anodize at a comparatively fast rate when the switches 100–1 to 100–18 are set at the "series-fast" position or "shunt-fast" position, and anodize at a comparatively slow rate when they are in the "series-slow" or "shunt-slow" positions. The switches 100–1 to 100–18 are automatically controlled by a computer 102, so that anodization takes place rapidly until the desired value is nearly in sight. Then, anodization takes place at a slower rate, to finally arrive at the precise value— somewhat comparable to a coarse and fine positioning operation. A common anodizer can be used for both series and shunt operations, the computer 102 controlling the anodizers via switches 101–1 through 101–18.

Other modifications may suggest themselves to those skilled in the art without departing from the spirit and scope of this invention. For example, equivalents other than T-pads can obviously be used. The use of the term T-pad, herein is meant to include not only the standard type T-pad but also such equivalents as the distributed T-pad depicted in FIGS. 2A and 2B.

What is claimed is:

1. A method of anodizing a pair of serially connected film resistors $R_1$, $R_2$ so that the resistors are trimmed to substantially equal values $r$, $r$, wherein, initially, $R_1=r_1$, $R_2=r_2$; $r_1<r$; and $r_2<r$; and further wherein an anodizing electrolyte is placed along the serially connected resistors $R_1$, $R_2$; and a cathode is placed in contact with the electrolyte, the method comprising:
    (a) measuring the serial resistance of $R_1$, $R_2$;
    (b) determining whether the value of the resistance of the resistor $R_1$ is greater than or less than the value of the resistance of the resistor $R_2$;
    (c) applying a direct current through said serially connected resistors $R_1$, $R_2$ in a direction from the lower valued resistance to the greater valued resistance thereby establishing a declining voltage gradient along the serially connected resistors; and
    (d) simultaneously with step (c) making said serially connected resistors anodic at anodizing potentials with respect to said cathode and maintaining said applied direct current and anodizing potentials until the measured serial resistance of $R_1$, $R_2$ equals $2r$.

2. The method, as recited in calim 1, wherein step (a) is performed alternately with steps (c) and (d) until the measured serial resistance $R_1$, $R_2$ equals $2r$.

3. A method of trimming an electrically T-shaped metallic film resistive device to a T-pad, having the series portion of the T-pad connected between a pair of terminals A and B and having the shunt portion of the T-pad connected between a terminal C and a point on the series portion substantially midway between the terminals A and B, to values having a serial resistance $2r$ and equal input and output impedances so that the resistance across the terminals A and C and the resistance across the terminals B and C are each substantially equal to each other, wherein an anodizing electrolyte is placed along the series portion of the resistive device and a cathode is placed in contact with the electrolyte, the method comprising:
    (a) measuring the serial resistance between the terminals A and B;
    (b) determining whether the resistance between the terminals A and C is greater than or less than the resistance between the terminals B and C;
    (c) applying a direct current through the serial portion of the device, between the terminals A and B, in a direction from the lower valued resistance to the greater valued resistance, as determined in step (b), thereby establishing a declining voltage gradient along the serial portion of the device; and
    (d) simultaneously with step (c) making said serially connected resistors anodic at anodizing potentials with respect to said cathode and maintaining said applied direct current and anodizing potentials until the measured serial resistance between the terminals A and B equals $2r$.

4. The method as recited in claim 3, wherein step (a) is performed alternately with steps (c) and (d).

5. The method, as recited in claim 3, of trimming an electrically T-shaped metallic film resistive device to a T-pad having a predetermined attenuation loss L, wherein an anodizing electrolyte and a cathode in contact therewith are placed along the shunt portion of the resistive device, said "shunt" electrolyte being isolated from the "series" electrolyte, the method further comprising:
    anodizing the shunt portion of the resistive device and measuring the attenuation loss thereof until the attenuation loss becomes equal to the predetermined value L.

6. Apparatus for anodizing a pair of serially connected film resistors $R_1$, $R_2$ so that the resistors are trimmed to substantially equal values $r$, $r$, wherein, initially $R_1=r_1$; $R_2=r_2$; $r_1<r$; and $r_2<r$, the apparatus comprising:
    (a) means for measuring the serial resistance of $R_1$, $R_2$;
    (b) means for determining whether the value of the resistance of the resistor $R_1$ is greater than or less than the value of the resistance of the resistor $R_2$;
    (c) means for applying a direct current through said serially connected resistors $R_1$, $R_2$ in a direction from the lower valued resistance to the greater valued resistance thereby establishing a declining voltage gradient along the serially connected resistors; and (d) means for making said serially connected resistors anodic with an anodizing potential with respect to a cathode in contact with an electrolyte on said resistors until the measured serial resistance of $R_1$, $R_2$ equals $2r$.

7. Apparatus for trimming an electrically T-shaped metallic film resistive device to a T-pad having the series portion of the T-pad connected between terminals A and B and having the shunt portion of the T-pad connected between a terminal C and a point on the series portion substantially midway between the terminals A and B, to values having a serial resistance $2r$ and equal input and output impedances so that the resistance across the terminals A and C and the resistance across the terminals B and C are each substantially equal to each other, said apparatus comprising:

(a) means for measuring the serial resistance between the terminals A and B;

(b) means for determining whether the resistance between the terminals A and C is greater than or less than the resistance between the terminals B and C;

(c) means for applying a direct current through the serial portion of the device, between the terminals A and B, in a direction from the lowered valued resistance to the greater valued resistance, as determined by the means of element (b), thereby establishing a declining voltage gradient along the serial portion of the device; and (d) means operative when the measured serial resistance is less than $2r$ for applying anodizing voltage across said serial portion of said device and a cathode in contact with an electrolyte along said serial portion.

8. Apparatus as recited in calim 7, further comprising: means for (1) operating element (c) and element (d) in synchronism such that the direct current and the anodizing voltage are simultaneously applied; and (2) iteratively operating element (a) alternatively with elements (c) and (d).

9. Apparatus, as recited in claim 7, for trimming said device to a T-pad having a predetermined attenuation loss L and including an anodizing electrolyte placed along the shunt portion of the resistive device, the latter "shunt" electrolyte being isolated from the "series" electrolyte, said apparatus further comprising:

means for alternately measuring the shunt portion of the resistive device and anodizing the attenuation loss thereof until the attenuation loss becomes equal to the predetermined value L.

10. Apparatus for trimming an electrically T-shaped metallic film resistive device to a T-pad having the series portion of the T-pad connected between terminals A and B and having the shunt portion of the T-pad connected between a terminal C and a point on the series portion substantially midway between the terminals A and B, to values having a serial resistance $2r$ and equal input and output impedances so that the resistance across the terminals A and C and the resistance across the terminals B and C are each substantially equal to each other, said apparatus comprising:

(a) series sequencing means for sequencing, iteratively, measuring, balancing, and anodizing operations for trimming the series portion of the device;

(b) means effective during an anodizing operation including (1) means for applying anodizing voltage across said serial portion of said device and said cathode; and (2) means for providing a direct current between the terminals A and B;

(c) means effective during a measuring operation for determining whether the series resistance of the device has reached the value $2r$, and, when so reached, causing the sequencing means to halt operations; and (d) means effective during a balancing operation including (1) means for comparing the resistance between the terminals A and C with the resistance between the terminals B and C; and (2) means responsive to said comparing means (i) when the resistance between the terminals A and C exceed the resistance between the terminals B and C for causing the direct current of (b) (2), above, to flow in the direction from the terminal B to the terminal A, and (ii) when the resistance between the terminals B and C exceed the resistance between the terminals A and C for causing the direct current of (b) (2), above, to flow in the direction from the terminal A to the terminal B.

11. The apparatus, as recited in claim 10 for trimming said device to a T-pad having a predetermined attenuation loss, further comprising:

(e) shunt sequencing means for sequencing, iteratively, measuring and anodizing operations for trimming the shunt portion of the device;

(f) means effective during an anodizing operation for trimming the shunt portion of the device including (1) a cathode for contact with said shunt deposited electrolyte, and (2) means for applying a pulse of anodizing voltage across the shunt portion of said device and said shunt cathode; and (g) means effective during a measuring operation for determining whether the attenuation loss of said device has reached said predetermined attenuation, and when so reached causing the sequencing means of step (e) to cease operation.

12. The apparatus as recited in claim 11, further comprising: means responsive to element (c) for (1) rendering the series sequencing means of element (a) inoperative to terminate the sequencing of operations for trimming the series portion of said device, and (2) rendering the shunt sequencing means of element (e) operative to initiate the sequencing of operations for trimming the shunt portion of said device.

References Cited

UNITED STATES PATENTS

| | | | |
|---|---|---|---|
| 3,148,129 | 9/1964 | Basseches et al. | 204—228 |
| 3,254,014 | 5/1966 | Daddona | 204—228 |
| 3,282,821 | 11/1966 | Cistola | 204—228 |
| 3,341,444 | 9/1967 | Chapelle | 204—228 |
| 3,341,445 | 9/1967 | Gerhard | 204—228 |

OTHER REFERENCES

The Western Electric Engineer, pp. 49–50, December 1967.

ROBERT K. MIHALEK, Primary Examiner

T. TUFARIELLO, Assistant Examiner

U.S. Cl. X.R.

204—228